United States Patent [19]

Satake

[11] Patent Number: 4,720,749
[45] Date of Patent: Jan. 19, 1988

[54] ELECTRONIC PRINT BOARD

[75] Inventor: Yoshiaki Satake, Ebina, Japan

[73] Assignee: Ricoh Company, Ltd., Tokyo, Japan

[21] Appl. No.: 908,006

[22] Filed: Sep. 16, 1986

[30] Foreign Application Priority Data

Sep. 19, 1985 [JP] Japan ................................. 60-205431

[51] Int. Cl.⁴ ............................................. H04N 1/40
[52] U.S. Cl. .................................... 358/280; 358/293; 358/294
[58] Field of Search ............... 358/293, 257, 280, 294, 358/256

[56] References Cited

U.S. PATENT DOCUMENTS

4,581,656 8/1986 Wada .................................. 358/293

Primary Examiner—Edward L. Coes, Sr.
Attorney, Agent, or Firm—Oblon, Fisher, Spivak, McClelland & Maier

[57] ABSTRACT

An electronic print board capable of printing out graphic information which may be written on a surface thereof is disclosed. The print board generates various kinds of extra graphic information to be added to graphic information which is written on the board surface. The information on the board and the extra information are edited together and, then, printed out.

8 Claims, 10 Drawing Figures

ELECTRONIC PRINT BOARD

BACKGROUND OF THE INVENTION

The present invention relates to an electronic print board capable of automatically printing not only graphic information written thereon but also various extra information to a hard copy.

In a meeting, proceedings are often aided by a blackboard, a whiteboard and other print boards on which characters and other graphic information may be written as desired. To prepare a minute book or report based on the graphic information written on the print board, the contents need to be duplicated on a paper. Traditionally, a recording secretary was appointed exclusively for the duplication work, i.e., to make a copy of the information by hand. Handwriting, however, consumes so much time that the business cannot be completed without frequent interruptions, while lacking accuracy due to clerical errors.

An automatic recording device for conference use which is generally referred to as an electronic print board is a recent achievement which solves the problems as stated above. Specifically, an electric print board is designed to automatically print graphic information written on its surface to a hard copy, thereby remarkably reducing time and labor necessary for duplication and enhancing the accuracy of recording. Such an electric print board is disclosed in, for example, U.S. Pat. No. 4,587,568 to Takayama et al. entitled "ELECTRONIC PRINT BOARD".

The problem with the prior art print boards of the type described is that the capability attainable therewith is merely producing a duplicate of information which is written on the board. When it is necessary for a date, a program, names of participants and other extra data to be recorded in a report, such data have to be handwritten on the board each time. Further, because the prior art print boards do not have a capability of arranging information in the form of a report, a substantial time and labor is eventually needed for a report to be produced.

SUMMARY OF THE INVENTION

It is therefore an object of the present invention to provide an electronic print board capable of automatically printing out even various kinds of extra information together with those which are written on the surface thereof.

It is another object of the present invention to provide a generally improved electronic print board.

An electronic print board for reading graphic information which is written on a surface of the print board, then temporarily storing the graphic information, and then printing out the graphic information of the present invention comprises an extra graphic information generating circuit for generating predetermined extra information other than the graphic information which is written on the print board, and a graphic information editing circuit for combining and editing the graphic information on the board and the extra graphic information.

The above and other objects, features and advantages of the present invention will become more apparent from the following detailed description taken with the accompanying drawings.

DESCRIPTION OF THE PREFERRED EMBODIMENTS

Figure 1:
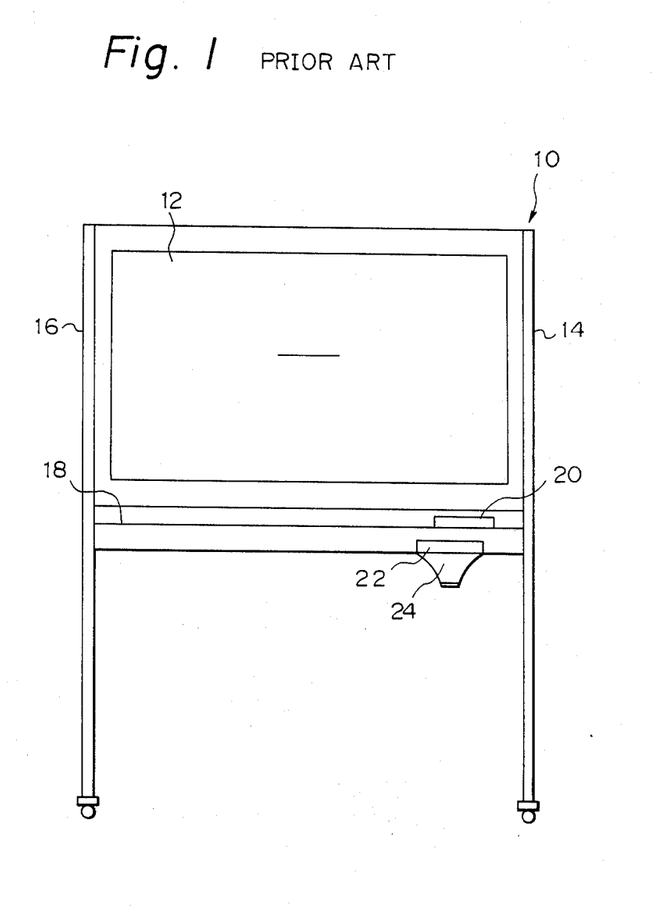
FIG. 1 is a schematic view of a prior art electronic print board.

To better understand the present, a brief reference will be made to a prior art electronic print board, shown in FIGS. 1 to 4. As shown in FIG. 1, a prior art electronic print board 10 appears substantially similar to an ordinary blackboard and includes a screen 12 which serves as a board surface. The screen 12 is constituted by an intermediate portion of a flexible writing sheet (not shown) which is accommodated in a roll configuration at a left end portion 14 and wound on a take-up roller (not shown) at a left end portion 16. Also positioned at the left end portion, or take-up portion, 16 are a line image sensor adapted to read information written on the screen 12 as well as optics which are associated with the line image sensor. The reference numeral 18 designates a dish in which a pen (felt pen) and an eraser may be put. An operating panel 20 is disposed in the dish 18 and made up of an input section for manipulating the print board 10 and a display section for displaying various kinds of information. Situated below the operating panel 20 is an outlet of a recording section through which a duplicate of graphic information read is produced. A tray 24 serves to receive a paper which is produced from the outlet 22.

Figure 2:
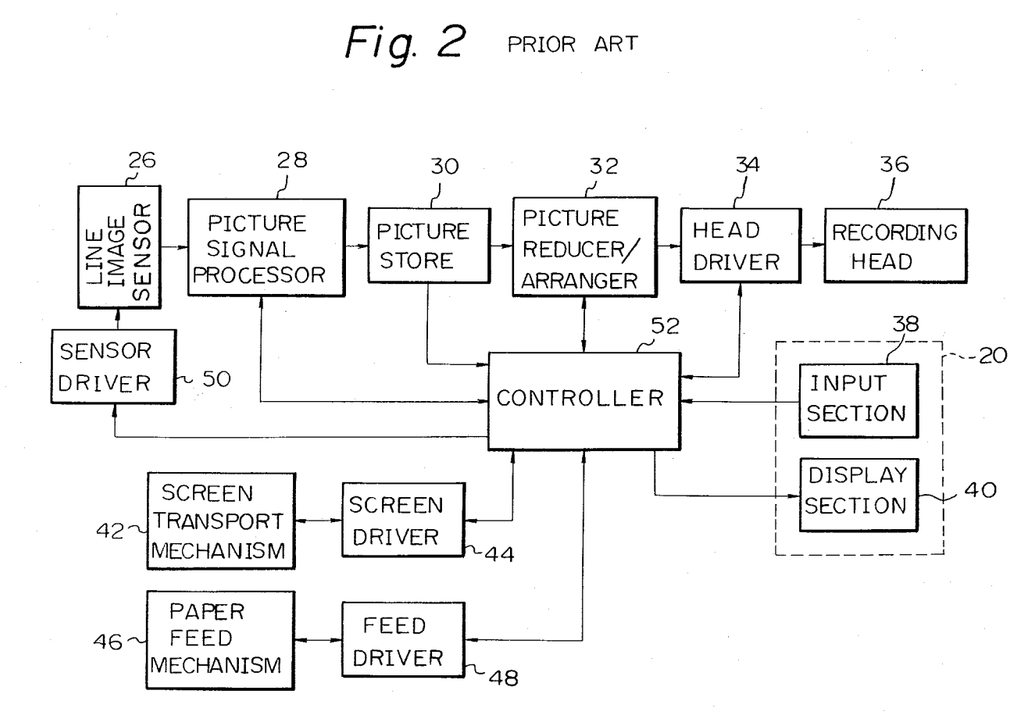
FIG. 2 is a block diagram of a prior art control system associated with an eletronic print board.

Referring to FIG. 2, a control system associated with the print board 10 is shown. As shown, an output signal of the line image sensor 26 is applied to a picture signal processing section, or picture signal processor, 28 adapted for shading correction and other picture signal corrections. An output signal of the processor 28 which is two-level picture information is temporarily stored in a picture storing section, or picture store, 30. Assuming that the flexible writing sheet is long enough to accommodate n pages of screen 12, for example, the picture store 30 has a capacity capable of storing at least (n+1) pages of screen 12. A picture reducing and arranging section, or picture recuder/arranger, 32 has a function of reducing a plurality of pages of pictures which are stored in the picture store 30 and arranging them in predetermined positions on a recording paper, so that a plurality of pages of pictures may be printed out on a single paper. The output of the section 32 is fed to a head driving section, or head driver, 34 which drives a recording head 36 of the recording section.

The input section 38 of the operating panel 20 includes various keys to allow a person to select and execute any function which is available with the print board 10. The display section 40, on the other hand, comprises various displays for displaying a selected function of the print board 10 as well as various conditions associated with the selected function. A screen transport mechanism 42 is adapted to wind and rewind the writing sheet driven by a screen driving section, or screen driver, 44. A paper feed mechanism 46 which is driven by a feed drive section, or feed driver, 48 serves to feed a paper one step at a time timed to the operation of the recording head 36.

The picture signal processor 28, picture store 30, picture reducer/arranger 32, head driver 34, display 40, screen driver 44, feed driver 48 as well as a driver 50 adapted to drive the line image sensor 26 are adequately controlled by a controller 52. Signals keyed in through the input section 38 are routed to the controller 52.

Figure 3:
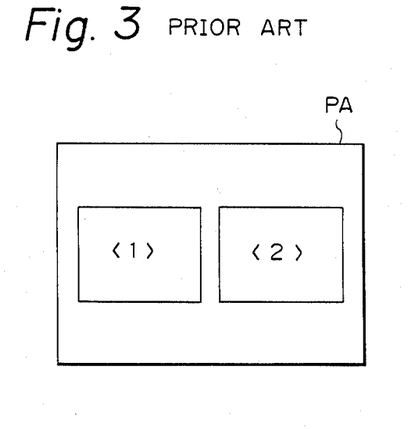
FIG. 3 is a plan view showing an exemplary arrangement of pictures on a recording paper produced.
Figure 4:
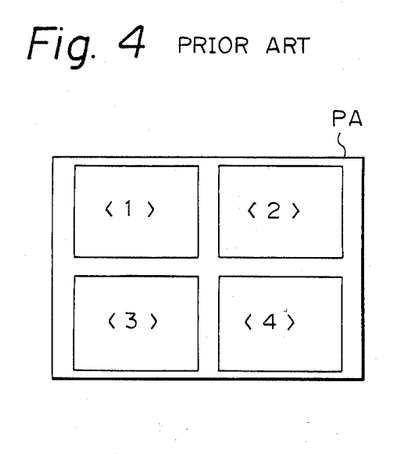
FIG. 4 is a view similar to FIG. 3, showing another possible arrangement of pictures on a recording paper.

The electronic print board 10 having the above construction is capable not only of duplicating a picture of one screen, or one page, 12 but also of printing pictures of two consecutive pages on a single paper PA side by side, as shown in FIG. 3, or even four pages of pictures in a predetermined layout, as shown in FIG. 4. Another capability of the print board 10 is producing as many copies of the same picture as a number entered on the input section 38. Thus, the print board 10 can record graphic information written thereon accurately and legibly and, if necessary, by rearranging them on a paper.

However, as previously stated, the capability attainable with the prior art print board 10 is merely producing a duplicate of information which is written on the board. This is disadvantageous in that when it is necessary for a date, a program, names of participants and other data to be recorded in a report, such data have to be written on the board each time. Further, because the prior art board 10 does not have a capability of arranging information in the form of a report, a substantial time and labor is eventually needed for a report to be produced.

Figure 5:
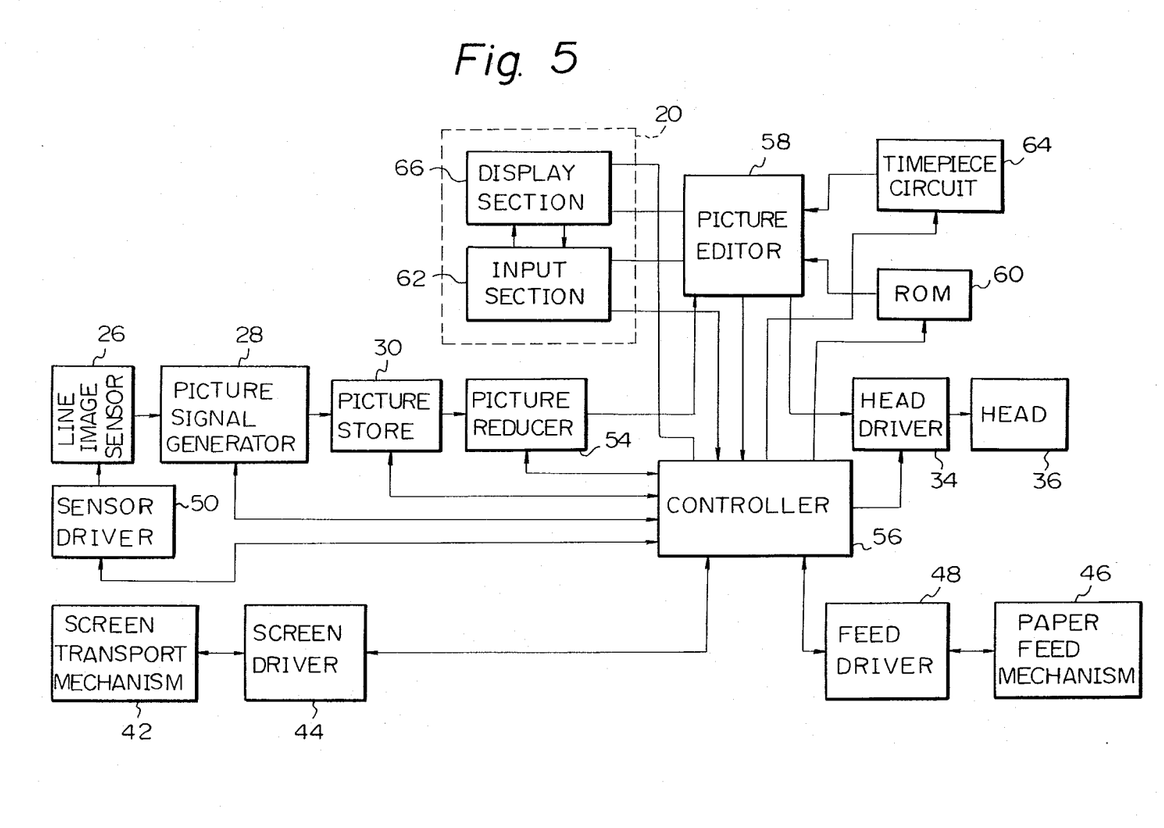
FIG. 5 is a block diagram of a control system which is associated with an electronic print board embodying the present invention.

Referring to FIG. 5, there is shown a control system associated with an electronic print board in accordance with one embodiment of the present invention. In FIG. 5, the same or similar structural elements as those shown in FIG. 2 are designated by like reference numerals.

As shown in FIG. 5, the control system includes a picture reducing section, or picture reducer, 54 adapted to reduce picture information, which is read out of a picture store 30, to a size as set up by a controller 56 and apply the reduced size to a picture editing section, or picture editor, 58. In response to form information which is read out of a read only memory (ROM), the picture editor 58 arranges the image information inputted from the picture reducer 54, names of participants and a program which are entered on an input section 62, and date information (including a time) which is supplied by a timepiece circuit 64, each in a predetermined position as defined in the particular form. The result of edition is applied to a head driver 34 so that it is printed out on a paper by a recording head 36. The ROM 60 stores a plurality of different form information. The controller 56 selects one of the stored form information or a combination of the same and feeds it to the picture editor 58. The timepiece circuit 64 has a so-called real time clock function and is usually backed up by a battery.

Figure 6:
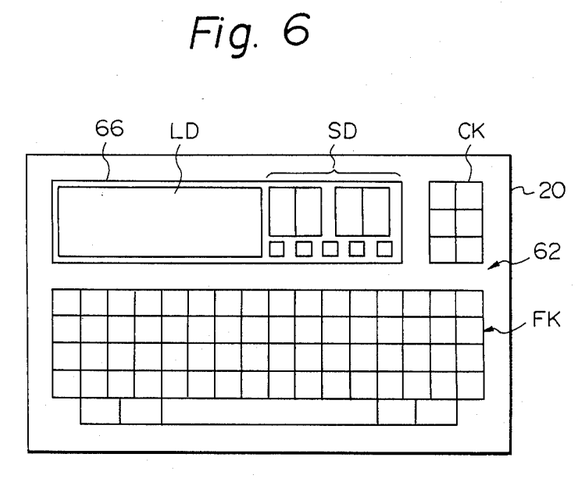
FIG. 6 is a plan view of a specific arrangement of an operating panel which is included in the print board of FIG. 5.

The input section 62 and a display section 66 are provided on an operating panel 20, as shown in FIG. 6. As shown, the input section 62 comprises a full key board FK for entering character information, control keys CK for manipulating the print board, and a Japanese processing section (not shown) for transforming character information entered on the full key board FK into Chinese character (Kanji) information. The display section 66, on the other hand, comprises a liquid crystal display LD for displaying as aggregations of dots the character information and others entered on the input section 62, and state displays SD for displayig operating states of the print board.

The input section 62 and the display section 66 as stated above implement a Japanese input function of substantially the same degree as a portable Japanese word processor, allowing a program and names of participants to be entered as desired.

Figure 7:
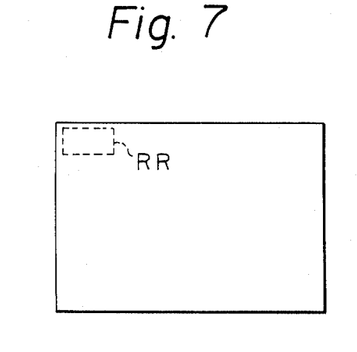
FIG. 7 is a plan view showing an exemplary form.
Figure 8:
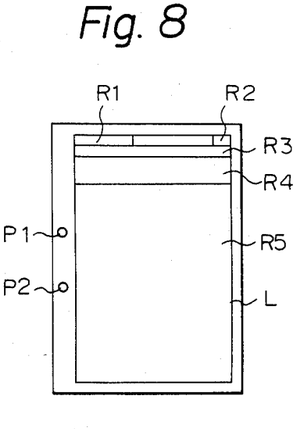
FIG. 8 is a view similar to FIG. 7, showing another possible form.

Examples of forms are shown in FIGS. 7 and 8.

In FIG. 7, the form is the most basic one in which a date is to be printed out in a space RR which is defined at the left shoulder of a picture. If desired, a page number may be entered in a suitable position other than the space RR. In Fig. 8, the format is usable as, for example, the first page of a report and comprised of a space R1 assigned to a date, a space R3 assigned to a program, a space R4 assigned to names of participants, and a space R5 assigned to information written on the board. Further, the form of FIG. 8 is provided with a border L and punching positions P1 and P2 to facilitate future binding. For the second page and onward, use may be made of a form which is identical with the form of FIG. 8 except for the omission of the spaces R3 and R4.

In operation, as a person keys in a particular form on the input section 62 guided by guidance information which appears on the display section 66, the entered information is applied to the controller 56. In response, the controller 56 delivers to the ROM 60 a read signal which corresponds to the selected form with the result that desired form data is fed to the picture editor 32. If the form includes the spaces for inserting names of participants and a program, the picture editor 58 urges the operator to enter such information by displaying messages on the display section 66. Then, the picture editor 58 recognizes character information which are sequentially entered on the input section 62 as name information and program information and inserts them in the predetermined spaces in the form. In addition, the picture editor 58 reads data information out of the timepiece circuit 64 to insert it in the space which is assigned thereto. In this instance, the picture editor 58 informs the controller 56 of a picture reduction ratio which is associated with the selected form, whereby a reduction ratio at the picture reducer 54 is determined. Further, when the selected form differs from a paper in vertical-horizontal orientation, the picture editor 58 causes the controller 56 to make the reduction ratio be different from the horizontal to the vertical dimensions or, alternatively, it turns the entered picture 90 degrees and inserts it in a corresponding space.

Thereafter, when the operator enters a record command on the input section 62, the picture edited as described above is printed out on a paper. During recording operation, the picture editor 58 counts the pages to sequentially insert page numbers in the predetermined space in the format.

As for the rest of the construction, the operation is the same as that of the prior art device and, therefore, will not be described to avoid redundancy.

Figure 9:
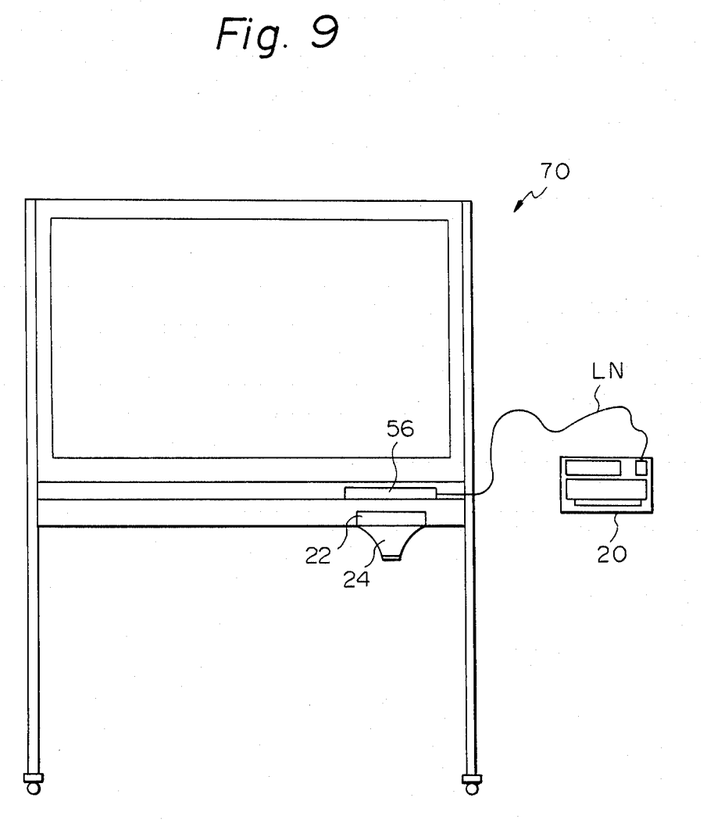
FIG. 9 is a schematic view of a specific implementation for connecting the operating panel of the print board.

In this particular embodiment, maneuvability of the operating panel 20 is somewhat limited since it is rigidly mounted on the print board. As shown in FIG. 9, the maneuvability may be enhanced by connecting the operating panel 20 to the controller 56 of a print board 70 by a wire LN; the panel 20 attains mobility within the length of the wire LN. In the arrangement of FIG. 9, too, the the print board 70 may be so constructed to accommodate the panel 20 therein.

Figure 10:
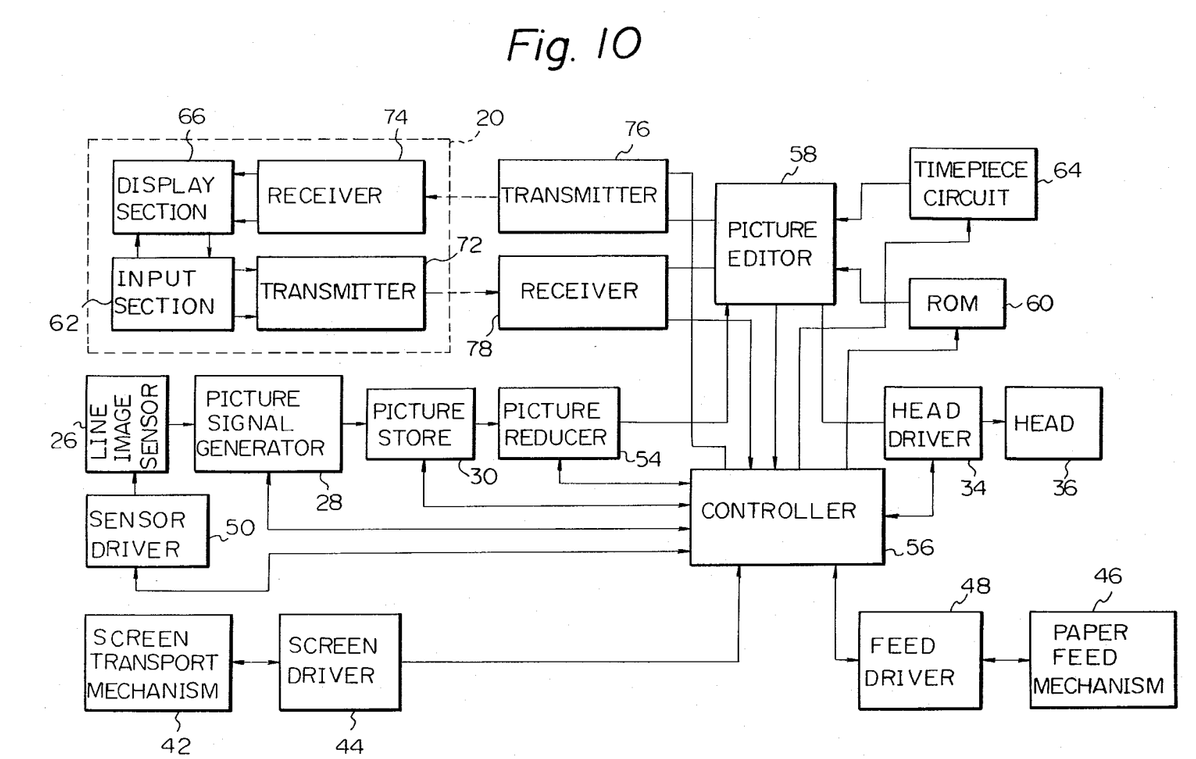
FIG. 10 is a block diagram showing a control system in accordance with another embodiment of the present invention.

Furthermore, wireless connection may then be used between the operating panel 20 and the print board of the present invention. In such a case, as shown in FIG. 10, the panel 20 may be provided with a transmitter 72 and a receiver 74 and the print board with a transmitter 76 and a receiver 78, allowing data to be interchanged between the panel 20 and the controller 56 and image editor 58 of the print board. The transmitters 72 and 76 and receivers 74 and 78 are interlinked by a carrier such as ultraviolet rays.

The wireless connection as stated above adds to the maneuvability since the operating panel 20 can be situated in any desired position on, for example, a conference table.

It is to be noted that the implementation for entering the names of participants shown and described, i.e., directly manipulating the input section 62 is only illustrative. For example, so long as participants carry with them individual identification cards in which names, divisions and others are magnetically recorded, such information may be entered through a magnetic card reader. Further, even a program may be recorded in a card or the like beforehand in order to much more simplify the construction of the input section 62.

An arrangement may be made such that a form read out of the ROM 60 is suitably variable by manipulation of the input section 62, in which case the display section 66 should preferably be replaced with a CRT or like display having a greater degree of display freedom.

In another possible construction, a desired form may be entered on an independent main control unit via a communication line or, alternatively, by use of a card, floppy disk and other recording media.

If desired, the form may further be provided with characters such as "TOP SECRET", "CIRCULATION" and "URGENT" as well as the name of a place where a meeting is held.

In summary, it will be seen that the present invention provides an electronic print board which allows various kinds of information other than those which are written on the board to be automatically printed out together with the latter in, for example, the form of a minute book.

Various modifications will become possible for those skilled in the art after receiving the teachings of the present disclosure without departing from the scope thereof.

What is claimed is:

1. An electronic print board for reading graphic information which is written on a surface of said print board, then temporarily storing said graphic information, and then printing out said graphic information, comprising:

extra graphic information generating means for generating predetermined extra information other than said graphic information which is written on said print board;

timepiece means for storing the current date and time;

graphic information editing means for combining and editing said graphic information on said board and said extra graphic information and wherein said graphic information editing means edits said graphic information, extra graphic information and date and time information based on form information, which is read out of said store means, in such a manner as to arrange said various information in individual positions which correspond to said form.

2. An electronic print board as claimed in claim 1, wherein said extra graphic information generating means comprises store means for storing various kinds of graphic information, and input means for inputting said extra graphic data, said input means being installed in an operating panel which is manipulated to operate said print board.

3. An electronic print board as claimed in claim 1, wherein said timepiece means has a real time clock function and is backed up by a battery.

4. An electronic print board as claimed in claim 2, further comprising display means installed in said operating panel for displaying various information inputted.

5. An electronic print board as claimed in claim 4, wherein said input means comprises a full key board and keys for operating said print board.

6. An electronic print board as claimed in claim 4, wherein said display means comprises a display for displaying information inputted on said input means and at least one state display for displaying an operating condition of said print board.

7. An electronic print board as claimed in claim 4, wherein said input means and said display means are connected to said print board by a wire to be operated at a remote place.

8. An electronic print board as claimed in claim 4, wherein said input means and said display means are connected to said print board by a wireless link to interchange data with said print board.

* * * * *